(12) United States Patent
Patel et al.

(10) Patent No.: US 10,648,392 B2
(45) Date of Patent: May 12, 2020

(54) LARGE DIESEL ENGINEER AFTERTREATMENT SYSTEM

(71) Applicant: Progress Rail Locomotive Inc., LaGrange, IL (US)

(72) Inventors: Ajay Patel, Joliet, IL (US); Deep Bandyopadhyay, Naperville, IL (US); Thean Mani Rajan Kanagaraj, Bangalore (IN); Raghavendra Tantry, Bangalore (IN)

(73) Assignee: Progress Rail Locomotive Inc, LaGrange, IL (US)

( * ) Notice: Subject to any disclaimer, the term of this patent is extended or adjusted under 35 U.S.C. 154(b) by 656 days.

(21) Appl. No.: 15/290,472

(22) Filed: Oct. 11, 2016

(65) Prior Publication Data

US 2018/0100420 A1  Apr. 12, 2018

(51) Int. Cl.
*F01N 13/00* (2010.01)
*F01N 3/20* (2006.01)
*F01N 3/28* (2006.01)

(52) U.S. Cl.
CPC ......... *F01N 13/004* (2013.01); *F01N 3/2066* (2013.01); *F01N 3/2828* (2013.01); *F01N 3/2892* (2013.01); *F01N 13/017* (2014.06); *F01N 2450/30* (2013.01); *F01N 2590/02* (2013.01); *F01N 2590/10* (2013.01); *Y02T 10/24* (2013.01)

(58) Field of Classification Search
CPC .... F01N 3/2892; F01N 3/2066; F01N 13/004; F01N 13/011; F01N 13/017; F01N 13/009; F01N 13/0093; F01N 13/0097; F01N 2240/20; F01N 2470/02; F01N 2590/02; Y02T 10/24
USPC .................................. 60/295, 301, 305, 324
See application file for complete search history.

(56) References Cited

U.S. PATENT DOCUMENTS

| | | | |
|---|---|---|---|
| 5,065,576 A | 11/1991 | Kanazawa et al. | |
| 6,391,421 B1 * | 5/2002 | Bruck ................ | B01D 53/9454 428/116 |
| 6,475,453 B1 * | 11/2002 | Mathes .............. | B01D 53/9431 422/169 |
| 8,752,370 B2 | 6/2014 | Hittle et al. | |
| 2013/0098002 A1 | 4/2013 | Danckert et al. | |

(Continued)

FOREIGN PATENT DOCUMENTS

KR  101593485 B1  2/2016

*Primary Examiner* — Mark A Laurenzi
*Assistant Examiner* — Mickey H France
(74) *Attorney, Agent, or Firm* — Miller, Matthias & Hull

(57) ABSTRACT

An aftertreatment system for a diesel engine is disclosed. The aftertreatment system may include a first flow conduit configured to convey an exhaust gas stream, and a first diffuser assembly positioned fluidly downstream of the first flow conduit and be configured to increase flow uniformity of the exhaust gas stream. The first diffuser assembly may include a first disperser having a honeycomb structure surrounded by a first outer frame. The first disperser may have a number of cells per square inch defining a first cell density. The aftertreatment system may also include a first selective catalytic reduction cassette positioned fluidly downstream of the first diffuser assembly, and the first selective catalytic reduction cassette may include a selective catalytic reduction catalyst.

19 Claims, 10 Drawing Sheets

(56) References Cited

U.S. PATENT DOCUMENTS

2015/0165378 A1 6/2015 Boeshans et al.
2015/0260071 A1 9/2015 Reichert et al.

* cited by examiner

LARGE DIESEL ENGINEER AFTERTREATMENT SYSTEM

TECHNICAL FIELD

This disclosure generally relates to a large diesel engine and, more particularly, to an aftertreatment system for a large diesel engine.

BACKGROUND

Generally speaking, diesel engines may be divided into three separate sizes, small, medium, and large. Small engines generally have a power output less than 50 kilowatts ("kW"), while medium sized diesel engines have a power output ranging between 50 and 500 kW. Large diesel engines most often have a power output greater than 500 kW.

Large diesel engines may further be classified as high, medium, and low speed. Typically, high speed large diesel engines operate at greater than 1000 rotations per minute ("RPM"), and have a cylinder displacement less than 20 liters per cylinder. Medium speed large diesel engines, on the other hand, commonly function between 1000 and 400 RPM, and have a cylinder displacement between 20 and 30 liters per cylinder. Low speed large diesel engines will typically operate at less than 400 RPM, and comprise a cylinder displacement greater than 30 liters per cylinder.

Increased exhaust back pressure can have numerous effects on diesel engines, including increased pumping work, reduced intake manifold boost pressure, and turbocharger problems. While increased exhaust back pressure affects the operation of all diesel engines, it especially affects large diesel engines, and particularly medium and low speed large diesel engines. Accordingly, in order to reduce exhaust back pressure, aftertreatment systems for medium and low speed large diesel engines are designed with an enclosure with a large volume and cross-sectional area, and a larger volume of selective catalytic reduction ("SCR") catalyst bed. However, increasing the volume of the enclosure and cross-sectional area, and the volume of the SCR catalyst bed, also decreases flow uniformity of the exhaust gases through the SCR catalyst bed, thereby decreasing the effectiveness of the aftertreatment system. Accordingly, a need exists for an aftertreatment system for a medium and low speed large diesel engine having increased flow uniformity.

US Patent Application 2013/0098002 to Danckert at al. ("Danckert") discloses an exhaust gas treatment device for off-road applications. More specifically, Danckert discloses a SCR system including a circularly shaped canister through which a diffuser tube is positioned in an antechamber. This is followed by a single honeycomb styled mixer and then a hydrolysis catalytic convertor is positioned just upstream of two SCR catalyst beds. While arguably effective for its specific purpose, Danckert only discloses this particular arrangement, and fails to disclose how it would be applied to medium and low speed large diesel engines to increase flow uniformity.

The present disclosure is directed to overcoming one or more problems set forth above and/or other problems associated with the prior art.

SUMMARY

In accordance with one aspect of the present disclosure, an aftertreatment system for a diesel engine is disclosed. The aftertreatment system may include a first flow conduit configured to convey an exhaust gas stream, and a first diffuser assembly positioned fluidly downstream of the first flow conduit and be configured to increase flow uniformity of the exhaust gas stream. The first diffuser assembly may include a first disperser having a honeycomb structure surrounded by a first outer frame. The first disperser may have a number of cells per square inch defining a first cell density. The aftertreatment system may also include a first selective catalytic reduction cassette positioned fluidly downstream of the first diffuser assembly, and the first selective catalytic reduction cassette may include a selective catalytic reduction catalyst.

In accordance with another aspect of the present disclosure, an aftertreatment system for a diesel engine, is disclosed. The aftertreatment system may include a first flow conduit configured to convey an exhaust gas stream, and a first diffuser assembly positioned fluidly downstream of the first flow conduit and be configured to increase flow uniformity of the exhaust gas stream. The first diffuser assembly may include a first front side, a first back side, and a first airfoil fixedly attached to the first back side. The aftertreatment system may also include a first selective catalytic reduction cassette positioned fluidly downstream of the first diffuser assembly, and the first selective catalytic reduction cassette may include a selective catalytic reduction catalyst.

In accordance with another embodiment of the present disclosure, an aftertreatment system for a diesel engine in a marine vessel is disclosed The aftertreatment system may be in fluid communication with the diesel engine. The aftertreatment system may include a first flow conduit configured to convey an exhaust gas stream, a first diffuser assembly positioned fluidly downstream of the first flow conduit configured to increase flow uniformity of the exhaust gas stream, and a first selective reduction catalyst cassette positioned fluidly downstream of the first diffuser assembly. The first diffuser assembly may include a first disperser having a honeycomb structure surrounded by a first outer frame having a number of cells per square inch defining a first cell density. The first selective reduction catalyst cassette may include a selective reduction catalyst.

These and other aspects and features of the present disclosure will be more readily understood when read in conjunction with the accompanying drawings.

BRIEF DESCRIPTION

DETAILED DESCRIPTION OF THE DISCLOSURE

Figure 1:
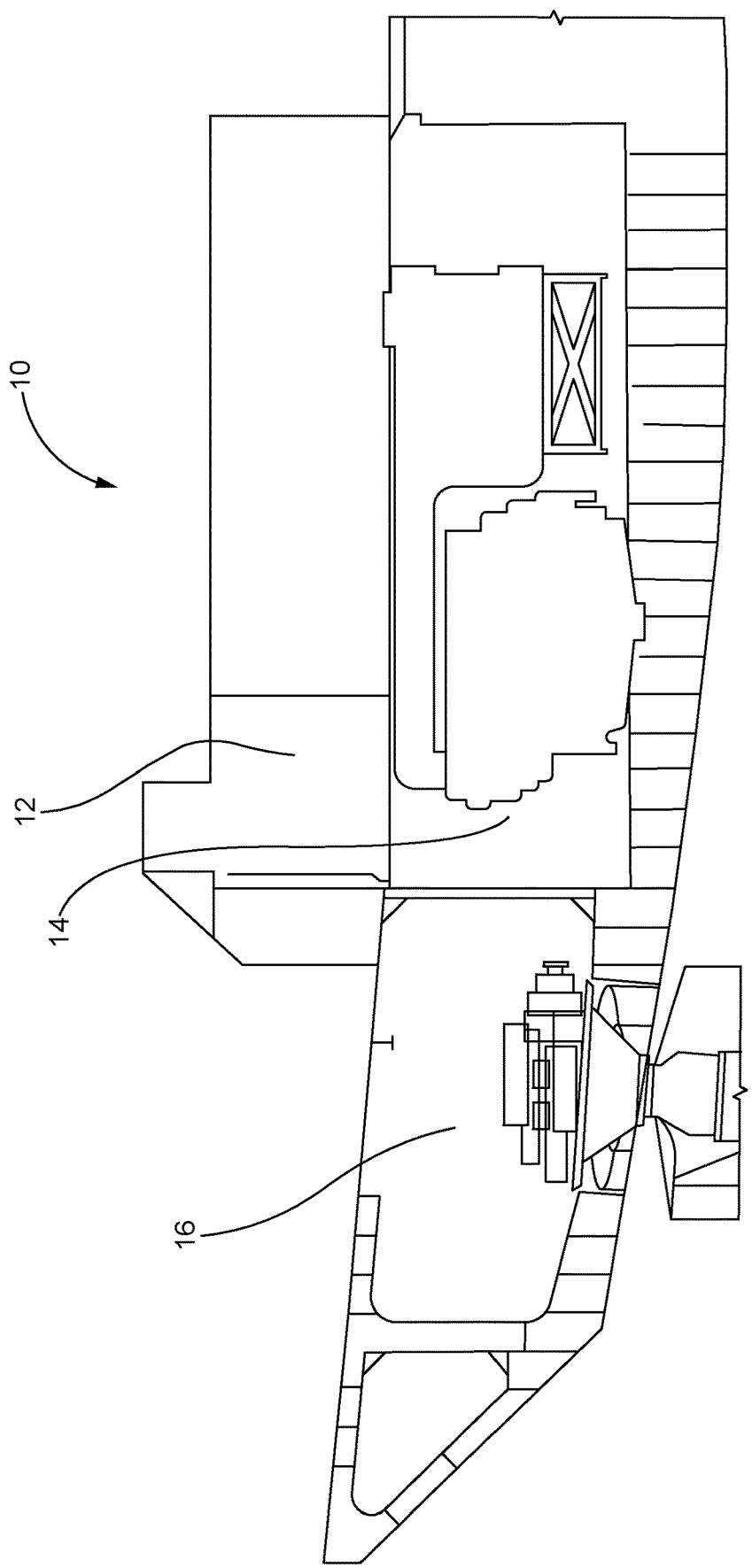
FIG. 1 is side, plan view of a portion of an exemplary work machine that may be manufactured in accordance with the present disclosure.

Referring now to the drawings, and with specific reference to FIG. 1, a work machine is illustrated and generally referred to by reference numeral 10. While the work machine 10 depicted is a marine vessel, this is only exemplary, as the teaching of the present disclosure can be employed elsewhere as well. For example, the work machine of the present disclosure may also be a dump truck, a dozer, and the like.

Figure 2:
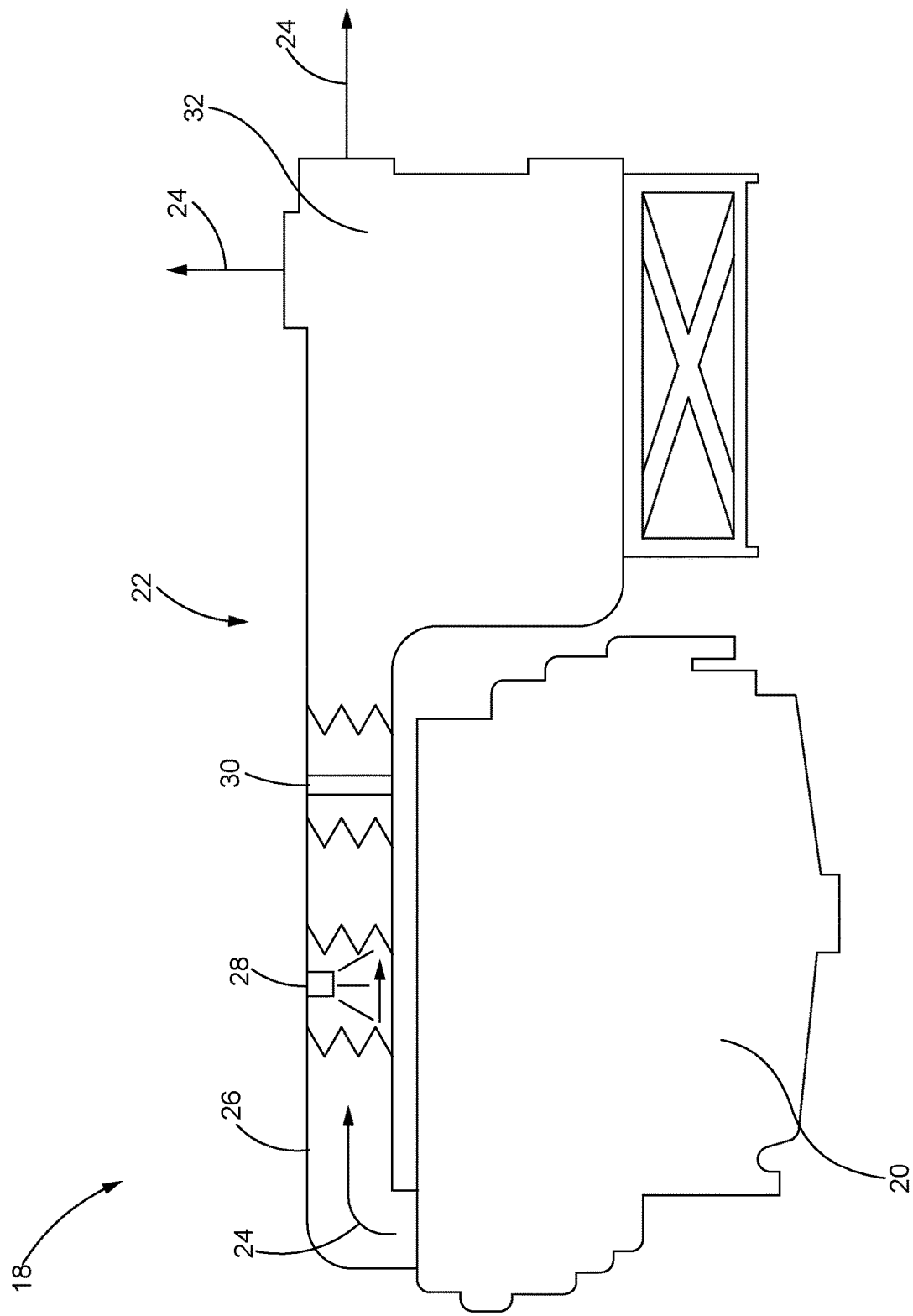
FIG. 2 is a partially cut-away side view of an exemplary medium and low speed large diesel engine system with reducing system that may be utilized with the with the work machine of FIG. 1.

The work machine 10 disclosed herein generally incorporates an operator station 12, a power section 14, and an ancillary equipment section 16. The power section 14 may include a medium and low speed diesel engine system, as depicted in the partially cut-away side view, of FIG. 2, and generally referred to by reference numeral 18. As shown, the medium and low speed diesel engine system 18 may include a medium speed or a low speed large diesel engine 20. As noted above, the medium speed or a low speed large diesel engine 20 most often has a power output greater than 500 kW. Further, the medium speed large diesel engine 20, commonly operates between 1000 and 400 RPM, and has a cylinder displacement between 20 and 30 liters per cylinder. Moreover, the low speed large diesel engine 20 typically operates at less than 400 RPM, and comprises a cylinder displacement greater than 30 liters per cylinder.

As further depicted, the medium and low speed diesel engine system 18 may include an aftertreatment system, generally referred to by numeral 22, in fluid communication with the medium speed or a low speed large diesel engine 20 that is configured to mitigate contaminants in an exhaust gas stream 24 exiting the medium speed or a low speed large diesel engine 20. These contaminants include, but are not limited to, carbon monoxide, hydrocarbon, diesel particulate matter ("DPM"), and nitrous oxides ("$NO_x$").

In order to mitigate $NO_x$, the exhaust gas stream 24 passes through a mixing tube 26 fluidly coupled to the medium speed or a low speed large diesel engine 20, and past a diesel exhaust fluid ("DEF") injector 28. The DEF injector 28 administers urea, ammonia, or other reductant, to the exhaust gas stream 24. Next, the exhaust gas stream 24 passes by a mixer 30 where the urea, ammonia, or other reductant, is more thoroughly incorporated with the exhaust gas stream 24. Finally, the exhaust gas stream 24 passes through a reducing system 32 wherein the $NO_x$ is actively reduced to nitrogen and water.

Figure 3:
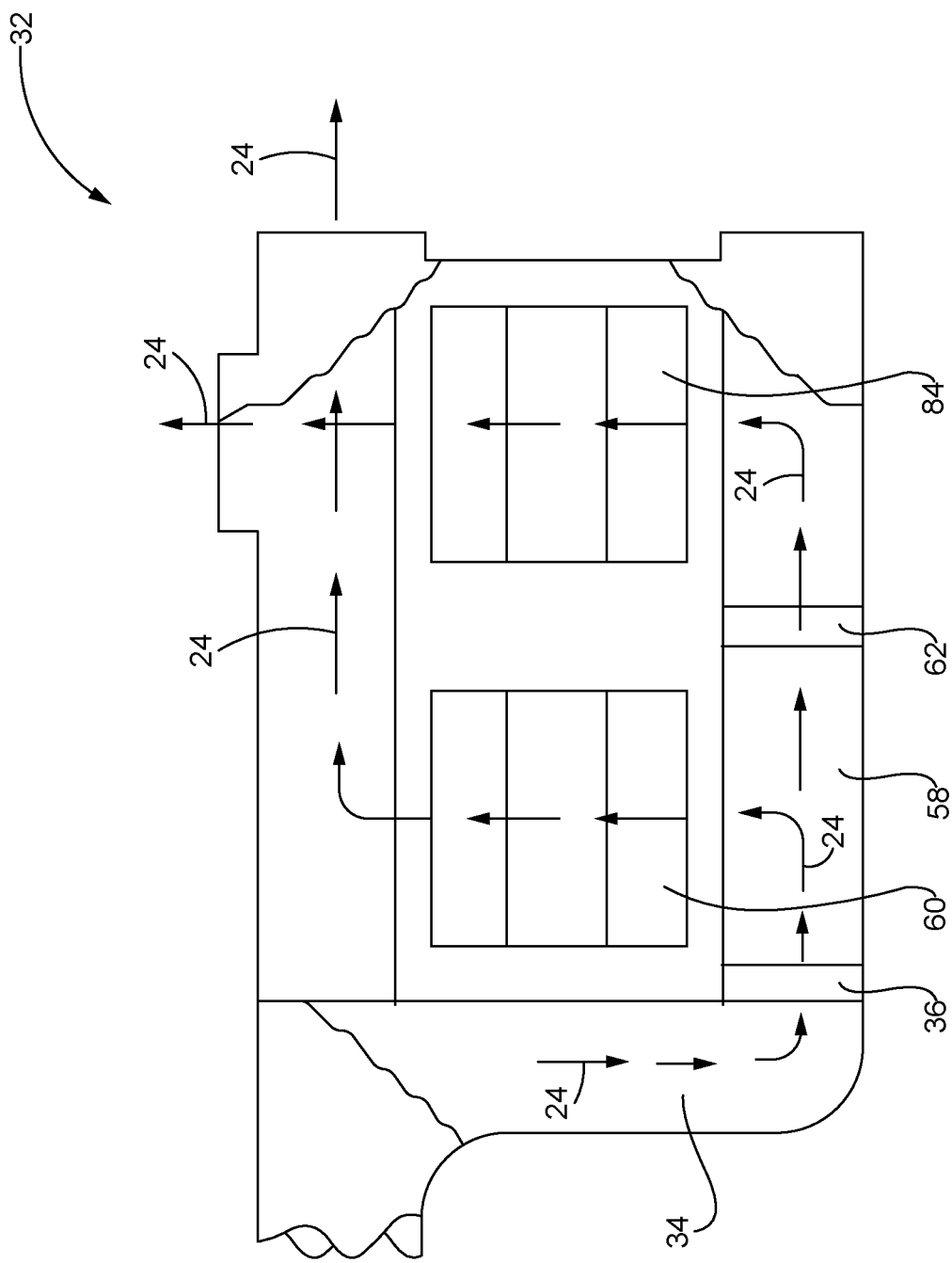
FIG. 3 is a partially cut-away side view, of the reducing system for the medium and low speed large diesel engine system of FIG. 2.

Turning to FIG. 3, a a partially cut-away side view of the reducing system 32 for the medium and low speed large diesel engine system 18 is depicted in more detail. As seen therein, the reducing system 32 may include a first flow conduit 34 configured to convey the exhaust gas stream 24. Next, the exhaust gas stream 24 will pass through a first diffuser assembly 36 configured to increase the flow uniformity of the exhaust gas stream 24.

Figure 4:
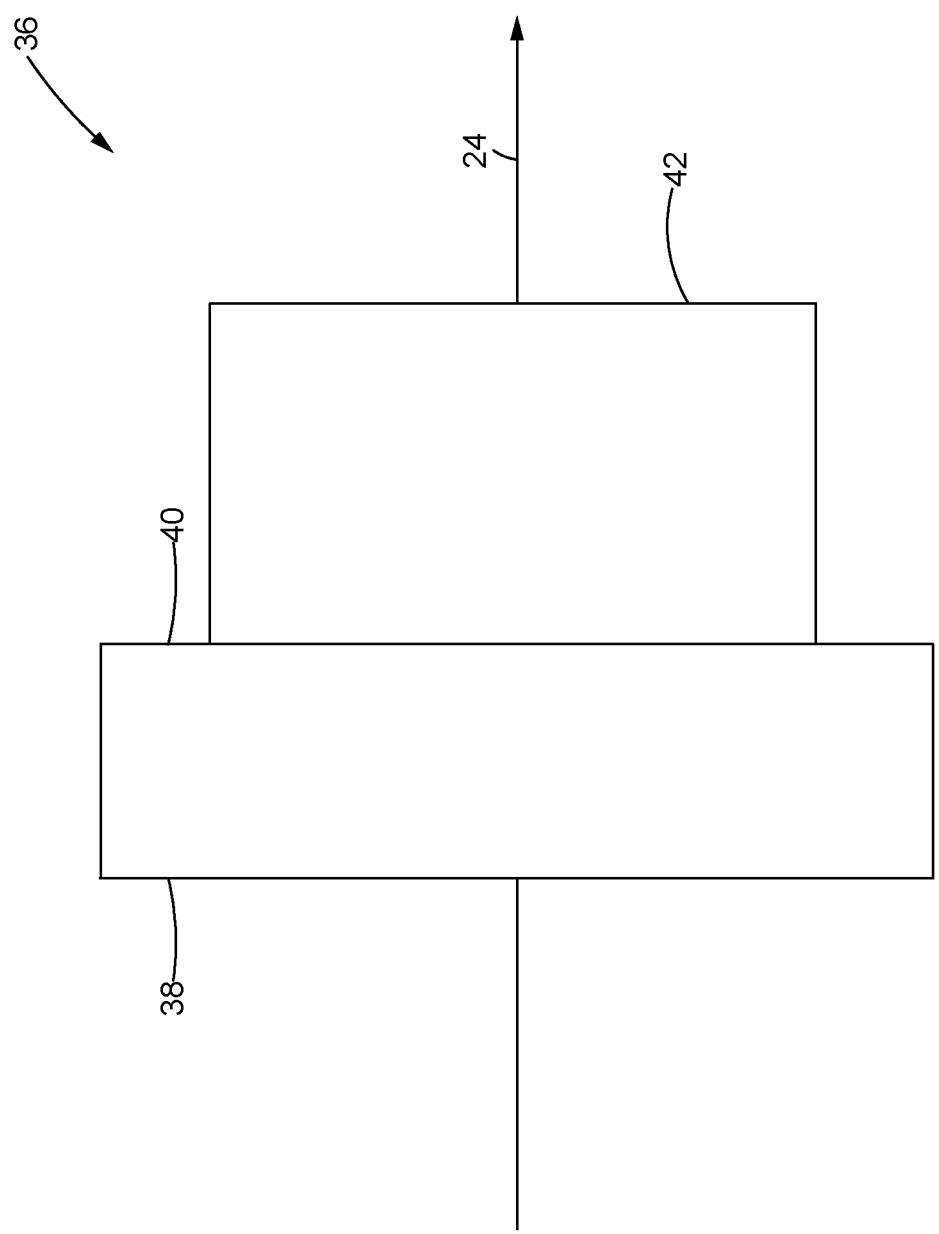
FIG. 4 is a side view of a first diffuser assembly for the reducing system of the medium and low speed large diesel engine system of FIG. 2.
Figure 5:
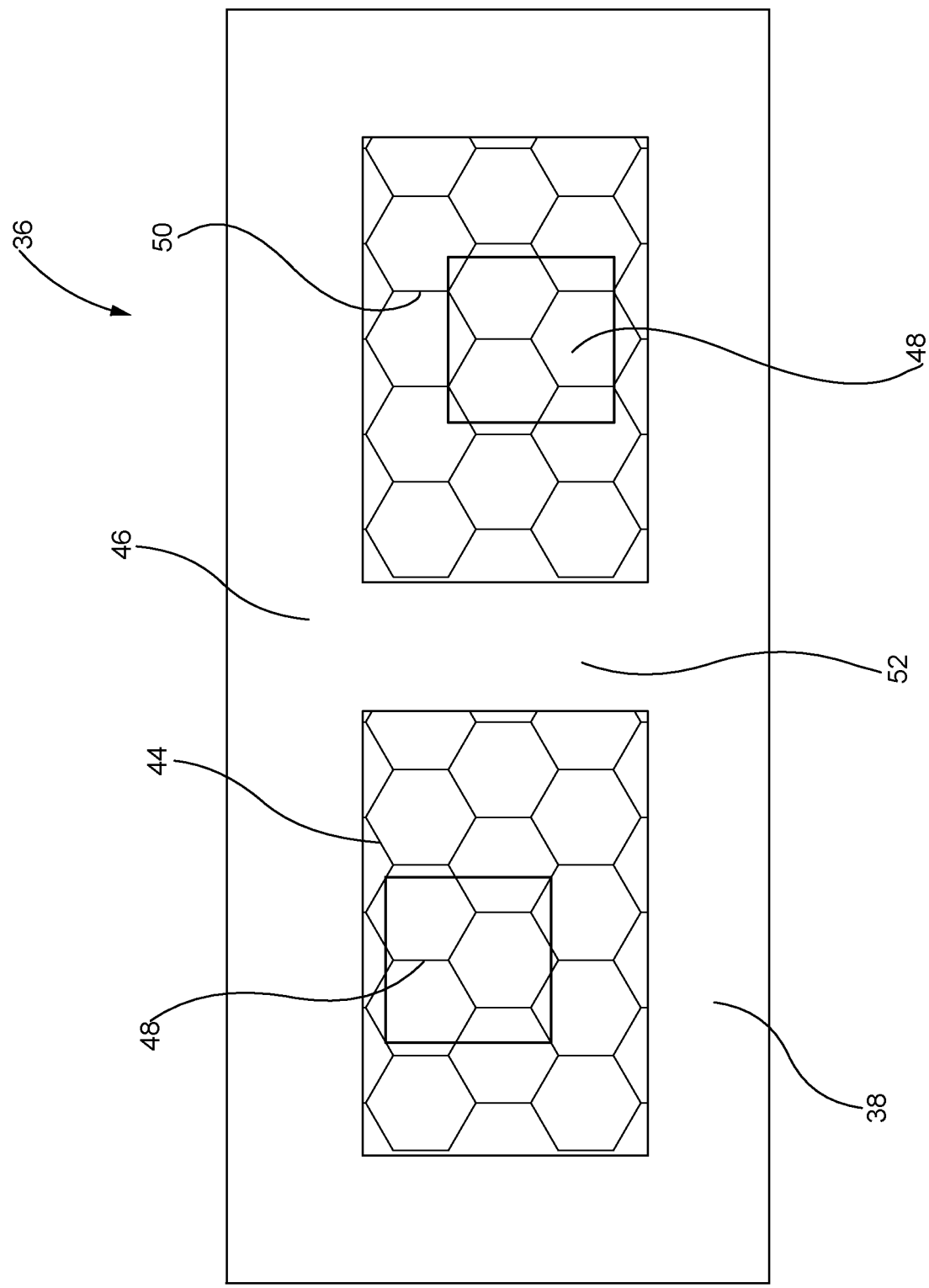
FIG. 5 is a front view of the first diffuser assembly for the reducing system of the medium and low speed large diesel engine system of FIG. 2.
Figure 6:
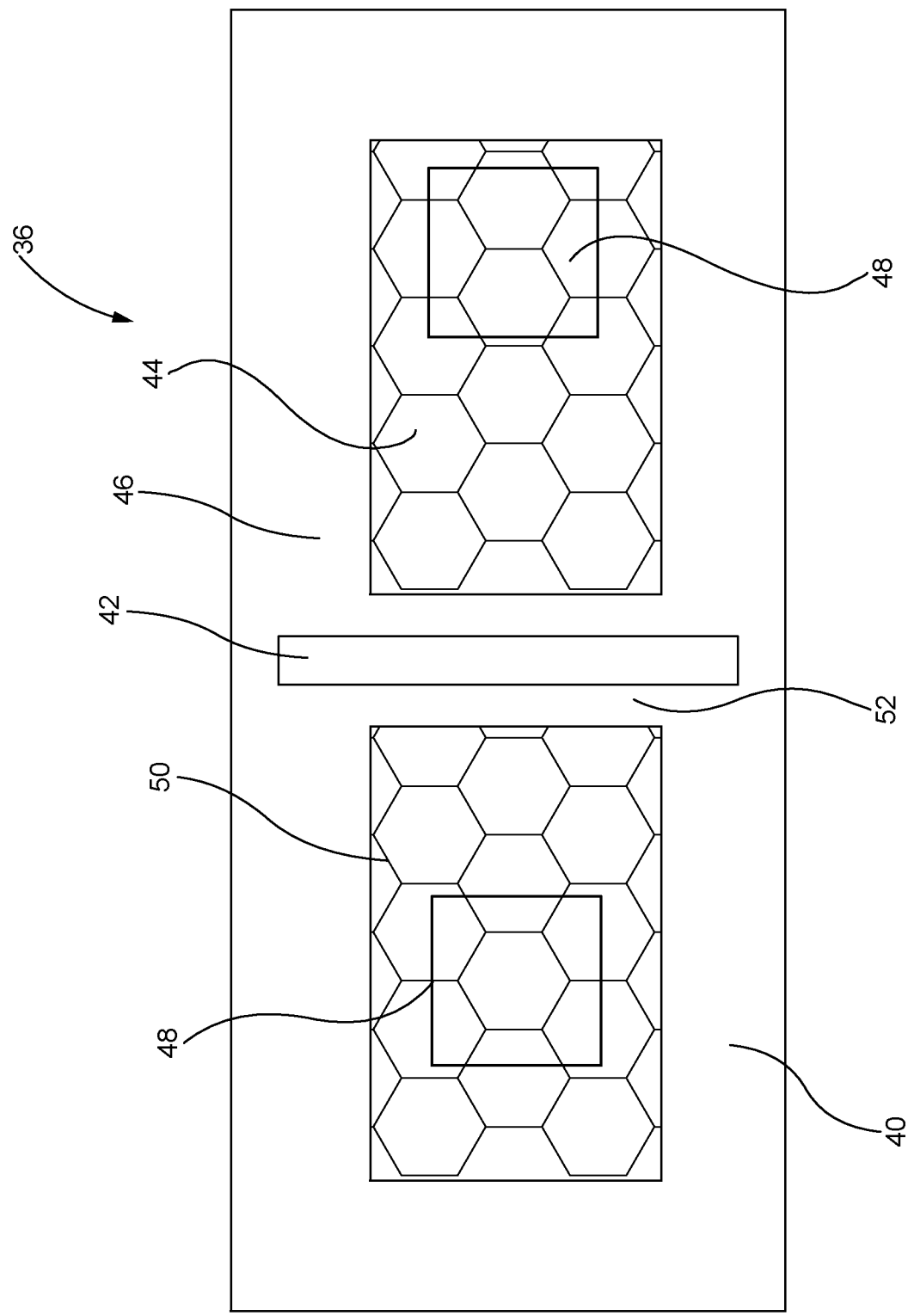
FIG. 6 is a back view of the first diffuser assembly for the reducing system of the medium and low speed large diesel engine system of FIG. 2.

While referring now to FIGS. 4-7, the design of the first diffuser assembly 36 will be described in more detail. As is seen in FIGS. 4-6, the first diffuser assembly 36 may include a first front side 38, a first back side 40 opposite the first front side 38, and a first airfoil 42 fixedly attached to the first back side 40. Turning specifically to FIGS. 5-6, the first diffuser assembly 36 may include a first disperser 44 having a honeycomb structure that is surrounded by a first outer frame 46. The first disperser 44 has a number of cells per square inch defining a first cell density 48. While the first disperser 44 is depicted as having a hexagonally-shaped cellular structure, this is only exemplary, as it may also have a triangularly-shaped, square-shaped, or even a pentagonally-shaped cellular structure.

The first diffuser assembly 36 may also include a second disperser 50 that is surrounded by the first outer frame 46, and that is laterally spaced apart from the first disperser 44 by first column 52 extending between the first outer frame 46. In one embodiment, the second disperser 50 has a number of cells per square inch equivalent to the first cell density 48. In another embodiment, the second disperser 50 may have a different number of cells per square inch than that of the first cell density 48. Although the second disperser 50 is depicted as having a hexagonally-shaped cellular structure, this is only exemplary, as it may also have a triangularly-shaped, square-shaped, or even a pentagonally-shaped cellular structure.

Figure 7:
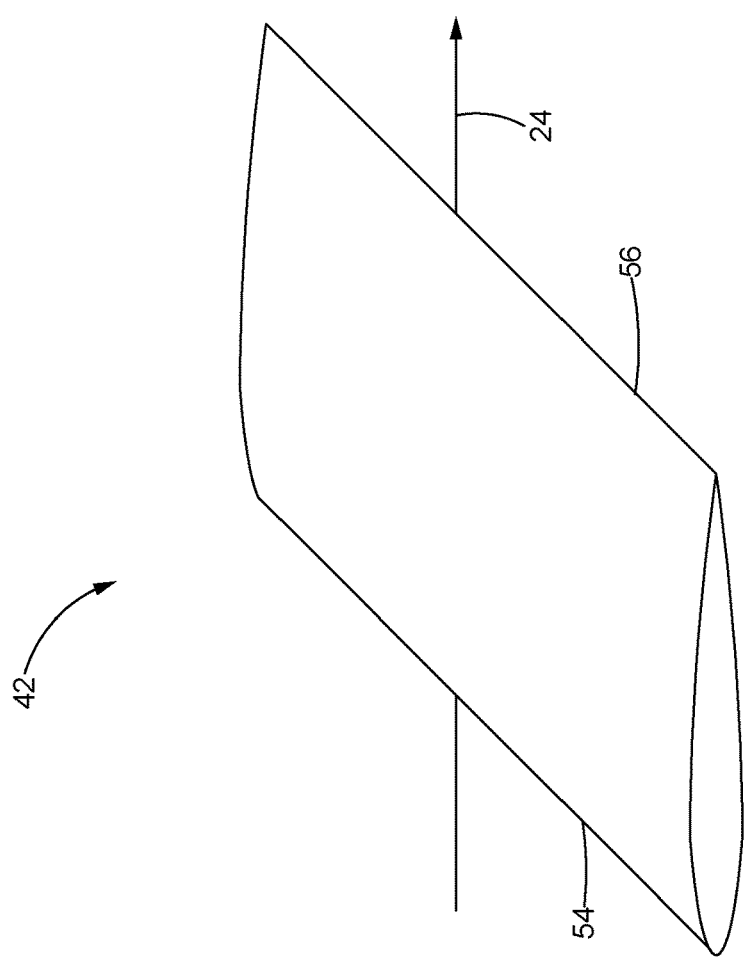
FIG. 7 is an isometric view of the first airfoil of the first diffuser assembly of the reducing system of the medium and low speed large diesel engine system of FIG. 2.

Turning to FIGS. 6-7, the first airfoil 42 has a symmetric curvilinear shape extending between a first leading edge 54 and a first trailing edge 56. The thickest portion of the first airfoil 42 is positioned closer to the first leading edge 54 than the first trailing edge 56. The first airfoil 42 is oriented so that the first leading edge 54 is fixedly attached to the first back side 40 of the first diffuser assembly 36. Moreover, and turning to each of FIGS. 3-7, the first diffuser assembly 36 is oriented so that the exhaust gas stream 24 simultaneously flows through both of the first disperser 44 and the second disperser 50, and subsequently past the first airfoil 42.

Referring back to FIG. 3, subsequent to the first diffuser assembly 36, the exhaust gas stream 24 may pass into a second flow conduit 58 positioned fluidly downstream of the first diffuser assembly 36. Some of the exhaust gas stream 24 will subsequently enter into a first selective catalytic reduction cassette 60 positioned fluidly downstream of the first diffuser assembly 36. The first selective catalytic reduction cassette 60 may include a selective reduction catalyst. Another portion of the exhaust gas stream 24 will pass through a second diffuser assembly 62 configured to increase the flow uniformity of the exhaust gas stream 24.

Figure 8:
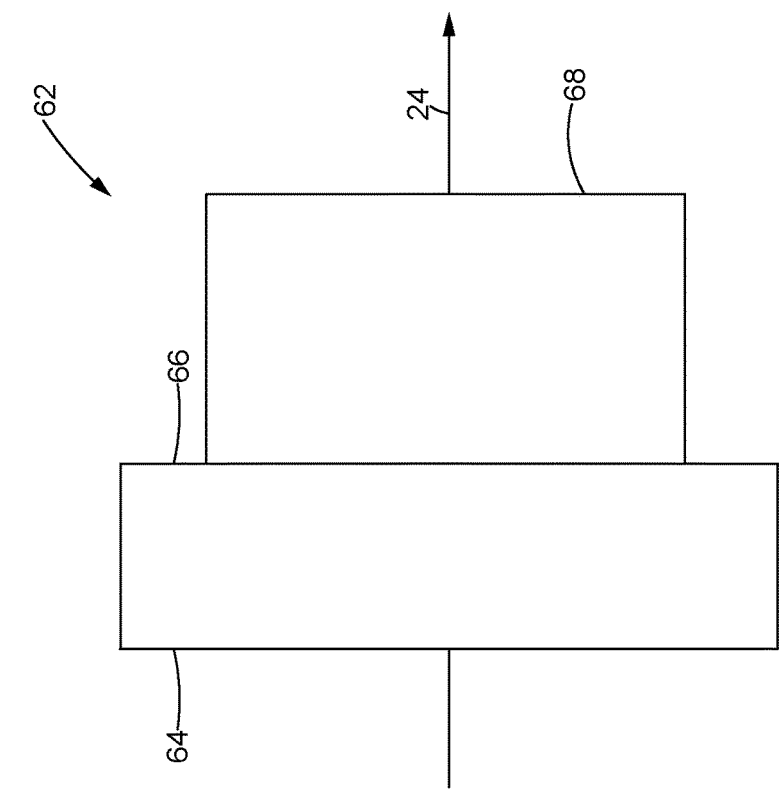
FIG. 8 is a side view of a second diffuser assembly for the reducing system of the medium and low speed large diesel engine system of FIG. 2.
Figure 9:
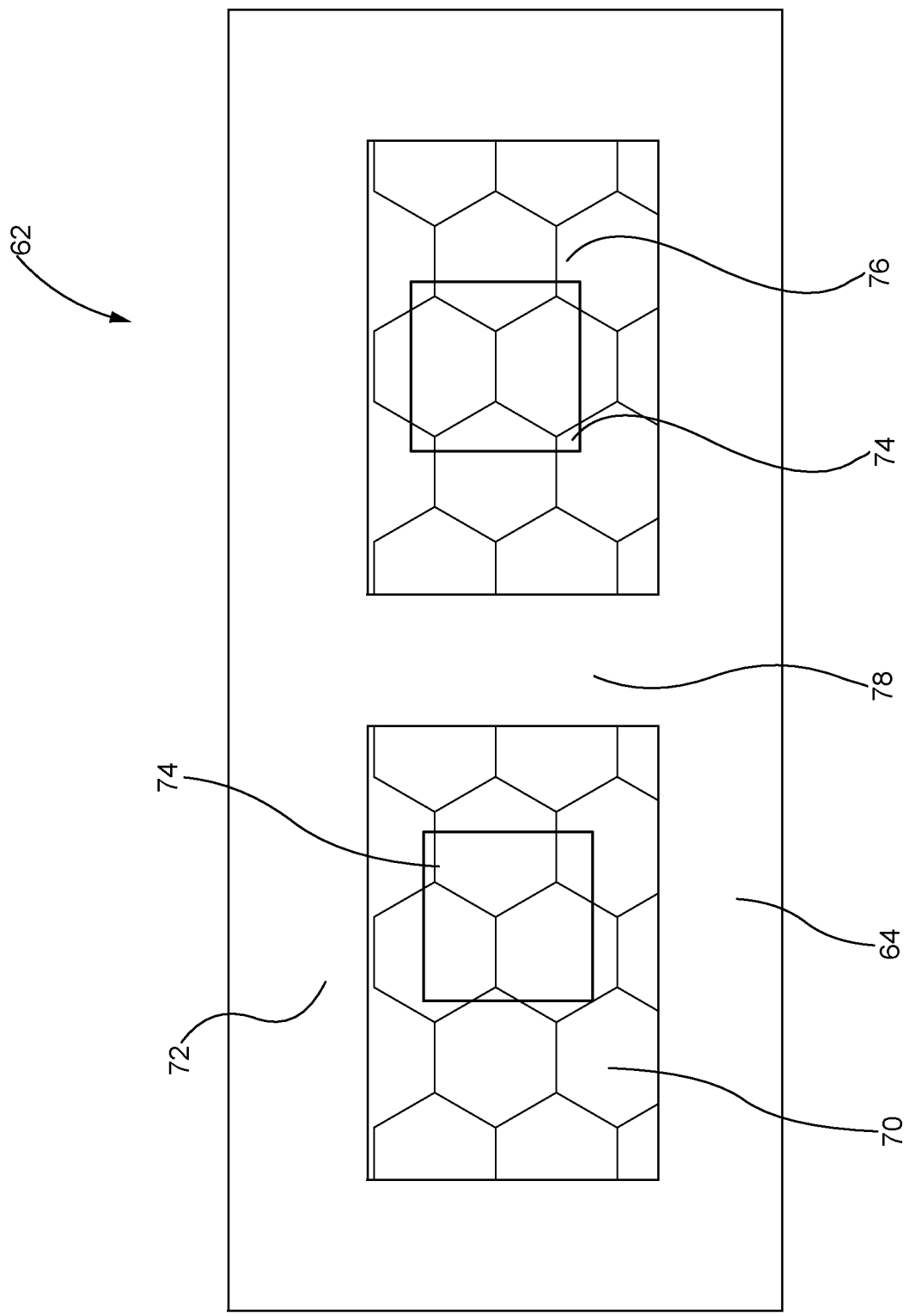
FIG. 9 is a front view of the second diffuser assembly for the reducing system of the medium and low speed large diesel engine system of FIG. 2.
Figure 10:
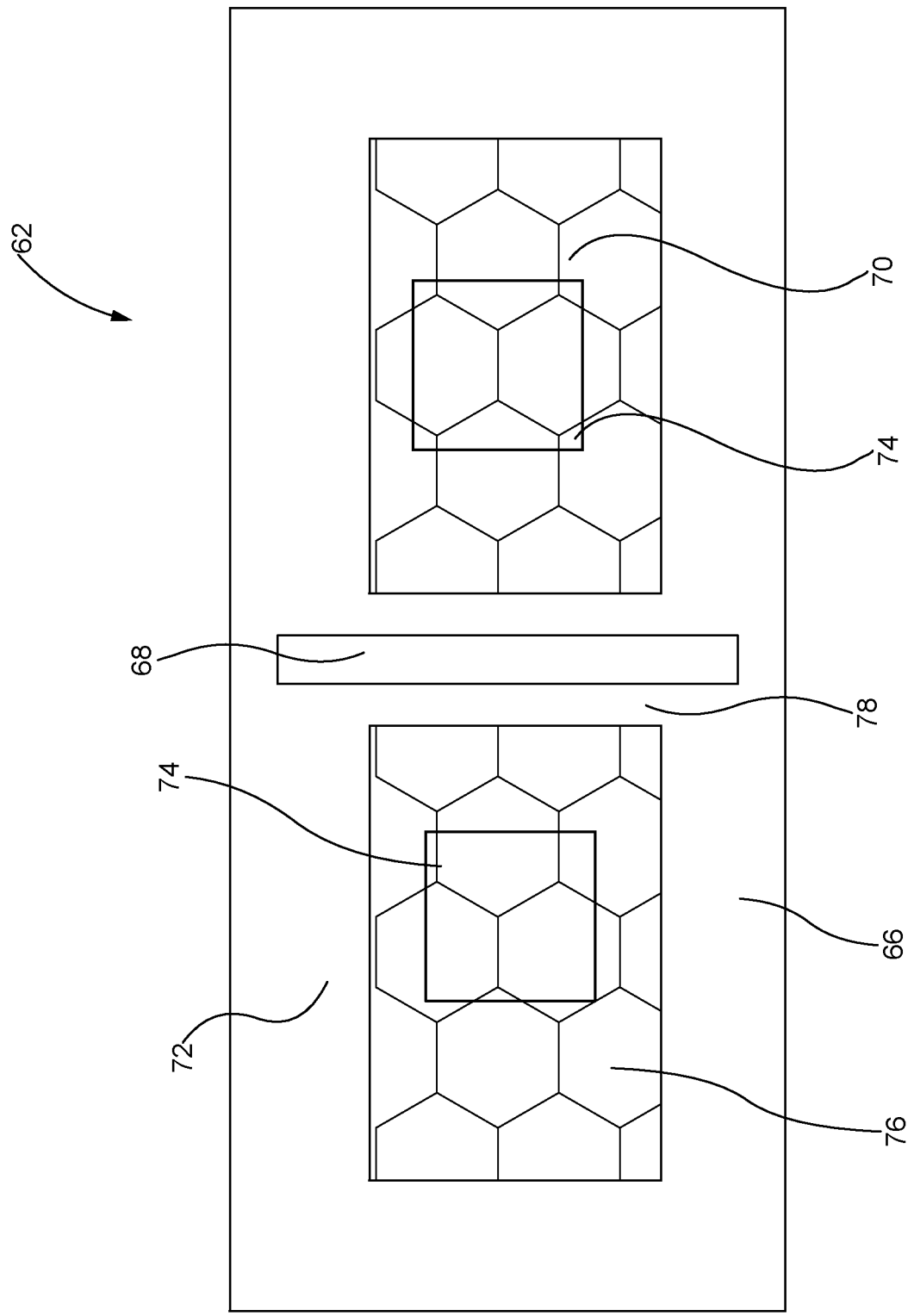
FIG. 10 is a back, plan view of the second diffuser assembly for the reducing system of the medium and low speed large diesel engine system of FIG. 2.
Figure 11:
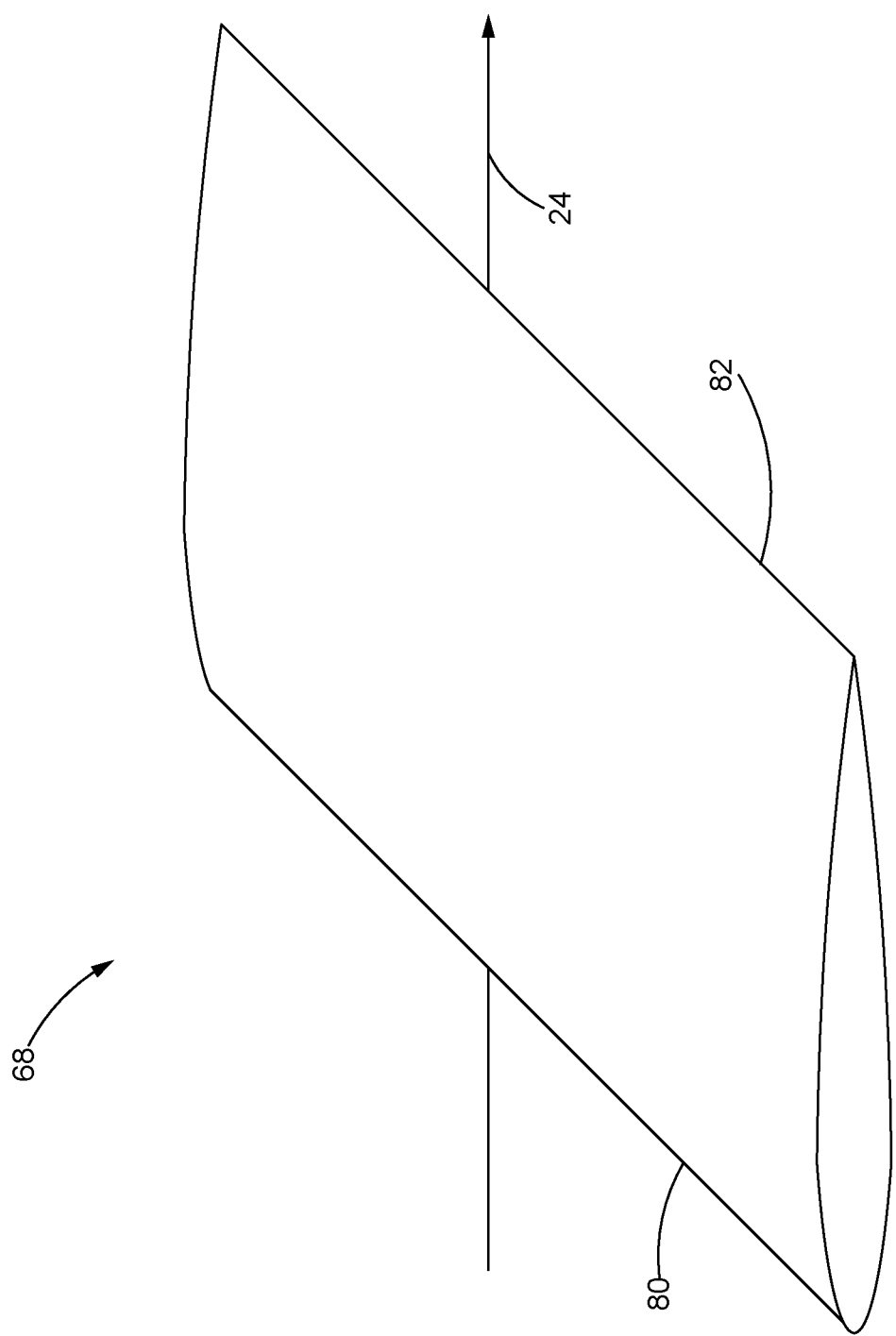
FIG. 11 is an isometric view of the second airfoil of the second diffuser assembly of the reducing system of the medium and low speed large diesel engine system of FIG. 2.

While referring to FIGS. 8-11, the design of the second diffuser assembly 62 will be described with more specificity. As is depicted in FIGS. 8-10, the second diffuser assembly 62 may have a second front side 64, and a second back side 66 opposite the second front side 64, and second airfoil 68 fixedly attached to the second back side 66. Referring specifically to FIGS. 9-10, the second diffuser assembly 62 may include a third disperser 70 having a honeycomb structure that is surrounded by a second outer frame 72. The third disperser 70 has a number of cells per square inch defining a second cell density 74. Though the third disperser 70 is depicted as having a hexagonally-shaped cellular structure, this is only exemplary, as it may also have a triangularly-shaped, square-shaped, or even a pentagonally-shaped cellular structure The second diffuser assembly 62 may also include a fourth disperser 76 that is surrounded by the second outer frame 72, and that is laterally spaced apart from the third disperser 70 by a second column 78 extending between the second outer frame 72. In one embodiment, the fourth disperser 76 has a number of cells per square inch equivalent to the second cell density 74. In another embodiment, the fourth disperser 76 has a number of cells per square inch different than the second cell density 74. In a preferred embodiment, the second cell density 74 is less than the first cell density 48. Although the fourth disperser 76 is depicted as having a hexagonally-shaped cellular structure, this is only exemplary, as it may also have a triangularly-shaped, square-shaped, or even a pentagonally-shaped cellular structure As is depicted in FIGS. 10-11, the second airfoil 68 has a symmetric curvilinear shape extending between a second leading edge 80 and a second trailing edge 82. The thickest portion of the second airfoil 68 is positioned closer to the second leading edge 80 than the second trailing edge 82. Moreover, the second airfoil 68 is oriented so that the second leading edge 80 is fixedly attached to the second back side 66 of the second diffuser assembly 62. Further, and while referring to each of FIGS. 3 and 8-11, the second diffuser assembly 62 is oriented so that the exhaust gas stream 24 simultaneously passes through both the third disperser 70 and the fourth disperser 76.

Turning back to FIG. 3, after passing through the second diffuser assembly 62, the exhaust gas stream 24 will move into a second selective catalytic reduction cassette 84. The second selective catalytic reduction cassette 84 may include the selective reduction catalyst. Eventually, the exhaust gas stream 24 having reduced NOx will pass through an exit 86 of the reducing system 32. From here, the exhaust gas stream 24 may be expelled to the atmosphere, or may enter into another unit operation, such as an ammonia oxidation ("AMOX") system, where excess DEF is removed before moving onto the atmosphere.

INDUSTRIAL APPLICABILITY

In general, the present disclosure may find applicability in many industries including, but not limited to, construction, shipping, earth-moving, and railways, and more particularly to aftertreatment systems for lessening contaminants found in diesel exhaust streams for work machines in these industries. Although applicable to any work machine, the present disclosure may be particularly applicable to a work machine utilizing a large diesel engine, and particularly medium and low speed large diesel engines. As previously explained, in order to reduce exhaust back pressure, aftertreatment systems for medium and low speed large diesel engines are designed with an enclosure with a large volume and cross-sectional area, and a larger volume of SCR catalyst bed. However, increasing the volume of the enclosure and cross-sectional area, and the volume of the SCR catalyst bed, also decreases flow uniformity of the exhaust gases through the SCR catalyst bed, thereby decreasing the effectiveness of the aftertreatment system. The present disclosure finds usefulness by increasing flow uniformity in aftertreatment systems for medium and low speed large diesel engines, thereby increasing aftertreatment system effectiveness.

In operation, the exhaust gas stream 24 enters the first flow conduit 34 and impinges upon the first diffuser assembly 36 configured to increase the flow uniformity of the exhaust gas stream 24. First the exhaust gas stream 24 passes through the first disperser 44 having a honeycomb structure and the second disperser 50 having a honeycomb structure. Each of the first disperser 44 and the second disperser 50 have a number of cells per square inch defining a first cell density 48. Next, the exhaust gas stream 24 flows around the first airfoil 42 fixedly attached to the first backside 40 of the first diffuser assembly 36. Passing through the first disperser 44, the second disperser 50, and flowing around the first airfoil 42 increases the flow uniformity of the exhaust gas stream 24. After passing by the first diffuser assembly 36, the exhaust gas stream 24 enters the second flow conduit 58. From here some of the exhaust gas stream 24 having increased flow uniformity enters the first selective catalytic reduction cassette 60 including the selective reduction catalyst. Since this portion of the exhaust gas stream 24 has increased flow uniformity, the $NO_x$ in this portion of the exhaust gas stream 24 is more easily reduced to nitrogen and water.

The other portion of the exhaust gas stream 24 in the second flow conduit 58 impinges upon the second diffuser assembly 62 configured to increase the flow uniformity of the exhaust gas stream 24. Next, the exhaust gas stream 24 passes through the third disperser 70 having a honeycomb structure and the fourth disperser 76 having a honeycomb structure. Each of the third disperser 70 and the fourth disperser 76 have a number of cells per square inch defining a second cell density 74. In a preferred embodiment, the second cell density 74 is less than the first cell density 48. Subsequently, the exhaust gas stream 24 flows around the second airfoil 68 fixedly attached to the second backside 66 of the second diffuser assembly 62. Passing through the third disperser 70, the fourth disperser 76, and flowing around the second airfoil 68 further increases the flow uniformity of the exhaust gas stream 24. After passing by the second diffuser assembly 62, the exhaust gas stream 24 may enter into the second selective catalytic reduction cassette 84 including the selective reduction catalyst. Since this portion of the exhaust gas stream 24 has increased flow uniformity, the $NO_x$ in this portion of the exhaust gas stream 24 is more easily reduced to nitrogen and water when passing through the second selective catalytic reduction cassette 84.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. An aftertreatment system for a diesel engine, comprising:
   a first flow conduit configured to convey an exhaust gas stream, wherein the exhaust gas stream comprises exhaust gas that has been mixed with a reductant solution;
   a first diffuser assembly positioned fluidly downstream of the first flow conduit, the first diffuser assembly including a first airfoil fixedly attached to a first back side, and a first disperser having a honeycomb structure and surrounded by a first outer frame, and wherein the first disperser has a number of cells per square inch defining a first cell density; and
   a first selective catalytic reduction cassette positioned fluidly downstream of the first diffuser assembly, the first selective catalytic reduction cassette including a selective catalytic reduction catalyst, wherein the first diffuser assembly is configured to increase flow uniformity of the exhaust gas stream before said exhaust gas stream flows through the selective catalytic reduction catalyst.

2. The aftertreatment system according to claim 1, wherein the first diffuser assembly further includes a second disperser having a honeycomb structure and also surrounded by the first outer frame, the second disperser spaced laterally apart from the first disperser by a first column extending between the first outer frame, and wherein the first diffuser assembly is oriented so that the exhaust gas stream simultaneously flows through both the first disperser and the second disperser.

3. The aftertreatment system according to claim 2, wherein the second disperser has the same number of cells per square inch defining the first cell density.

4. The aftertreatment system according to claim 1, further including a second flow conduit configured to convey the exhaust gas stream positioned fluidly downstream of the first diffuser assembly, further including a second diffuser assembly positioned fluidly downstream of the second flow conduit configured to increase flow uniformity of the exhaust gas stream, the second diffuser assembly including a third disperser having a honeycomb structure and surrounded by a second outer frame, and further including a second selective catalytic reduction cassette positioned fluidly downstream of the second diffuser assembly, the second selective catalytic reduction cassette including the selective catalytic reduction catalyst.

5. The aftertreatment system according to claim 4, wherein the third disperser has a number of cells per square inch defining a second cell density, and wherein the second cell density is less than the first cell density.

6. The aftertreatment system according to claim 5, wherein the second diffuser assembly further includes a fourth disperser having a honeycomb structure and also surrounded by the second outer frame, the fourth disperser spaced laterally apart from the third disperser by a second column extending between the second outer frame, and wherein the second diffuser assembly is oriented so that the exhaust gas stream simultaneously flows through both the third disperser and the fourth disperser.

7. The aftertreatment system according to claim 6, wherein the fourth disperser has the same number of cells per square inch defining the second cell density.

8. An aftertreatment system for a diesel engine in a marine vessel, comprising:
the aftertreatment system in fluid communication with the diesel engine, the aftertreatment system including a first flow conduit configured to convey an exhaust gas stream, a first diffuser assembly positioned fluidly downstream of the first flow conduit, and a first selective reduction catalyst cassette positioned fluidly downstream of the first diffuser assembly including a selective reduction catalyst, the first diffuser assembly including a first airfoil fixedly attached to a first back side, and a first disperser having a honeycomb structure surrounded by a first outer frame, and wherein the first disperser has a number of cells per square inch defining a first cell density, wherein the exhaust gas stream comprises exhaust gas that has been mixed with a reductant solution and the first diffuser assembly is configured to increase the flow uniformity of the exhaust gas stream before said exhaust gas stream flows through the selective catalytic reduction catalyst.

9. The aftertreatment system according to claim 8, wherein the first diffuser assembly further includes a second disperser having a honeycomb structure and also surrounded by the first outer frame, the second disperser spaced laterally apart from the first disperser by a first column extending between the first outer frame, and wherein the first diffuser assembly is oriented so that the exhaust gas stream simultaneously flows through both the first disperser and the second disperser.

10. The aftertreatment system according to claim 9, wherein the second disperser has the same number of cells per square inch defining the first cell density.

11. The aftertreatment system according to claim 1, wherein the first airfoil has a symmetric curvilinear shape extending between a first leading edge and a first trailing edge, and wherein the first airfoil is oriented such that the first leading edge is fixedly attached to the first back side.

12. The aftertreatment system according to claim 1, further including a second flow conduit configured to convey the exhaust gas stream positioned fluidly downstream of the first diffuser assembly, further including a second diffuser assembly positioned fluidly downstream of the second flow conduit configured to increase flow uniformity of the exhaust gas stream, the second diffuser assembly including a second front side and a second back side and a second airfoil fixedly attached to the second back side, and further including a second selective catalytic reduction cassette positioned fluidly downstream of the second diffuser assembly, the second selective catalytic reduction cassette including the selective catalytic reduction catalyst.

13. The aftertreatment system according to claim 12, wherein the second airfoil has a symmetric curvilinear shape extending between a second leading edge and a second trailing edge, and wherein the second airfoil is oriented such that the second trailing edge is fixedly attached to the second back side.

14. The aftertreatment system according to claim 10, wherein the first diffuser assembly further includes a first front side and the first airfoil is fixedly attached to the first back side, wherein the first airfoil has a symmetric curvilinear shape extending between a first leading edge and a first trailing edge, and wherein the first airfoil is oriented such that the first leading edge is fixedly attached to the first back side.

15. The aftertreatment system according to claim 14, wherein the aftertreatment system further includes a second flow conduit configured to convey the exhaust gas stream positioned fluidly downstream of the first diffuser assembly, a second diffuser assembly positioned fluidly downstream of the second flow conduit configured to increase flow uniformity of the exhaust gas stream, and a second selective catalytic reduction cassette positioned fluidly downstream of the second diffuser assembly, the second selective catalytic reduction cassette including the selective catalytic reduction catalyst, the second diffuser assembly including a third disperser having a honeycomb structure surrounded by a second outer frame, and wherein the third disperser has a number of cells per square inch defining a second cell density.

16. The aftertreatment system according to claim 15, wherein the second diffuser assembly further includes a fourth disperser having a honeycomb structure and also surrounded by the second outer frame, the fourth disperser spaced laterally apart from the third disperser by a second column extending between the second outer frame, and wherein the second diffuser assembly is oriented so that the exhaust gas stream simultaneously flows through both the third disperser and the fourth disperser.

17. The aftertreatment system according to claim 16, wherein the third disperser has the same number of cells per square inch defining the second cell density.

18. The aftertreatment system according to claim 17, wherein the second cell density is less than the first cell density.

19. The aftertreatment system according to claim 18, wherein the second diffuser assembly further includes a second front side, a second back side, and a second airfoil fixedly attached to the second back side, wherein the second airfoil has a symmetric curvilinear shape extending between a second leading edge and a second trailing edge, and wherein the second airfoil is oriented so that the second leading edge is fixedly attached to the second back side.

* * * * *